Sept. 22, 1925. Re: 16,169

J. A. CAMERON ET AL

SLITTING AND REWINDING MACHINE

Original Filed Dec. 9, 1916 10 Sheets-Sheet 1

James A. Cameron and Fenton B. Bird
INVENTORS

BY

Fred V. Beeken
ATTORNEY.

Sept. 22, 1925. Re. 16,169

J. A. CAMERON ET AL

SLITTING AND REWINDING MACHINE

Original Filed Dec. 9, 1916 10 Sheets-Sheet 2

James A. Cameron and Gustaf B. Bird
INVENTORS

BY

Fred N. Beeler
ATTORNEY.

Sept. 22, 1925.

J. A. CAMERON ET AL

Re. 16,169

SLITTING AND REWINDING MACHINE

Original Filed Dec. 9, 1916 10 Sheets-Sheet 3

James A. Cameron and Gustav B. Peick
INVENTORS

BY

Paul V. Peeler
ATTORNEY.

Sept. 22, 1925. Re. 16,169

J. A. CAMERON ET AL

SLITTING AND REWINDING MACHINE

Original Filed Dec. 9, 1916 10 Sheets-Sheet 4

James A. Cameron and Fenton B. Beck
INVENTORS

BY

Fred W. Decker
ATTORNEY.

Sept. 22, 1925. Re. 16,169

J. A. CAMERON ET AL

SLITTING AND REWINDING MACHINE

Original Filed Dec. 9, 1916 10 Sheets-Sheet 5

James A. Cameron & Gustav B. Brick
INVENTORS

BY

Neil V. Becker
ATTORNEY.

Sept. 22, 1925. Re. 16,169

J. A. CAMERON ET AL

SLITTING AND REWINDING MACHINE

Original Filed Dec. 9, 1916 10 Sheets-Sheet 6

James A Cameron & Gustav B Birch
INVENTORS

BY

Wm V Bocken
ATTORNEY.

Sept. 22, 1925. Re. 16,169

J. A. CAMERON ET AL

SLITTING AND REWINDING MACHINE

Original Filed Dec. 9, 1916 10 Sheets-Sheet 7

James A Cameron & Gustav B Beck
INVENTORS

BY

Fred B Becker
ATTORNEY.

Sept. 22, 1925. Re. 16,169

J. A. CAMERON ET AL

SLITTING AND REWINDING MACHINE

Original Filed Dec. 9, 1916 10 Sheets-Sheet 8

James A. Cameron & Gustav B. Bach
INVENTORS

BY

Fred V. Beeken
ATTORNEY.

Sept. 22, 1925. Re. 16,169
J. A. CAMERON ET AL
SLITTING AND REWINDING MACHINE
Original Filed Dec. 9, 1916 10 Sheets-Sheet 9
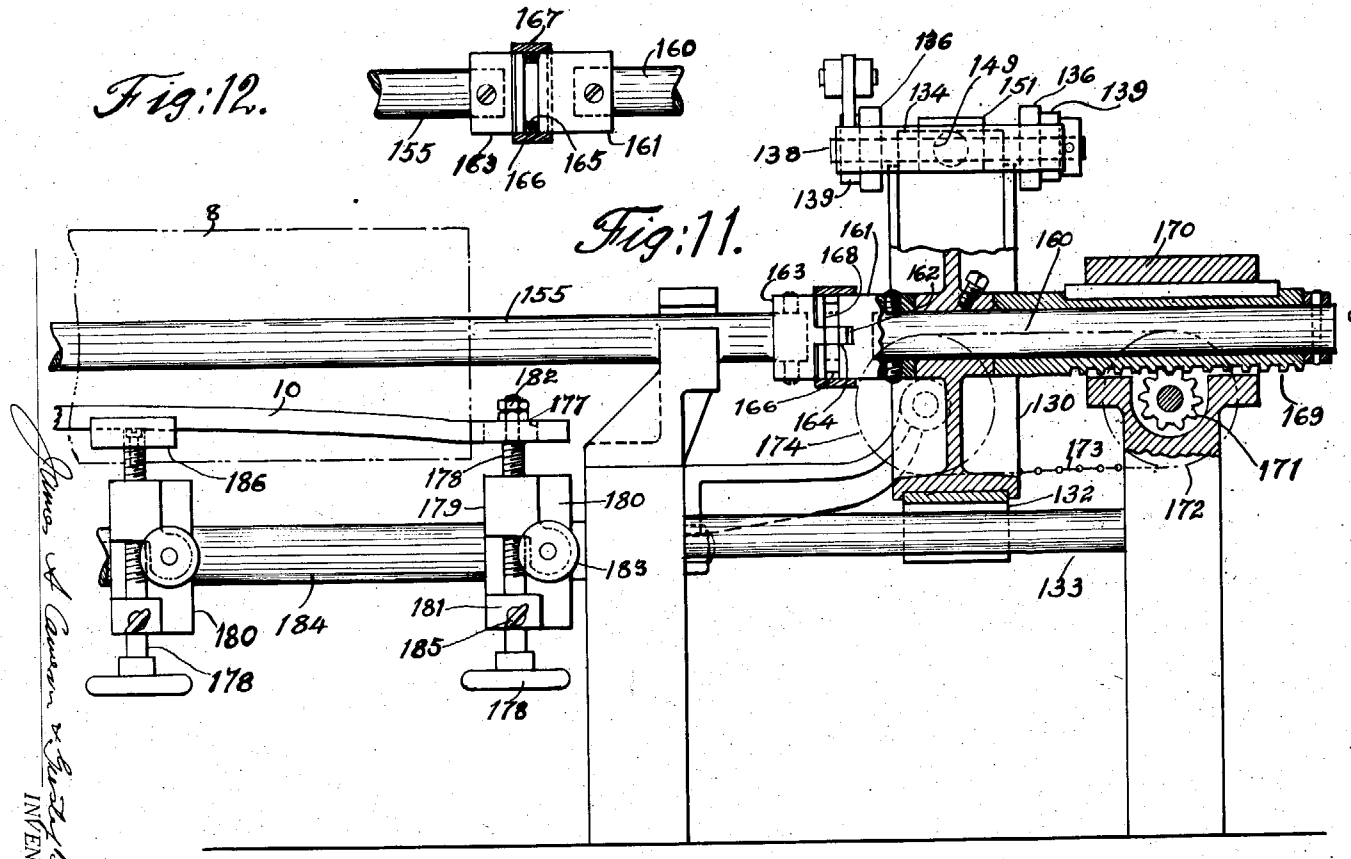
James A. Cameron & Gustav B. Birch
INVENTORS
BY
Geo. V. Beeton
ATTORNEY.

Sept. 22, 1925. Re. 16,169
J. A. CAMERON ET AL
SLITTING AND REWINDING MACHINE
Original Filed Dec. 9, 1916 10 Sheets-Sheet 10
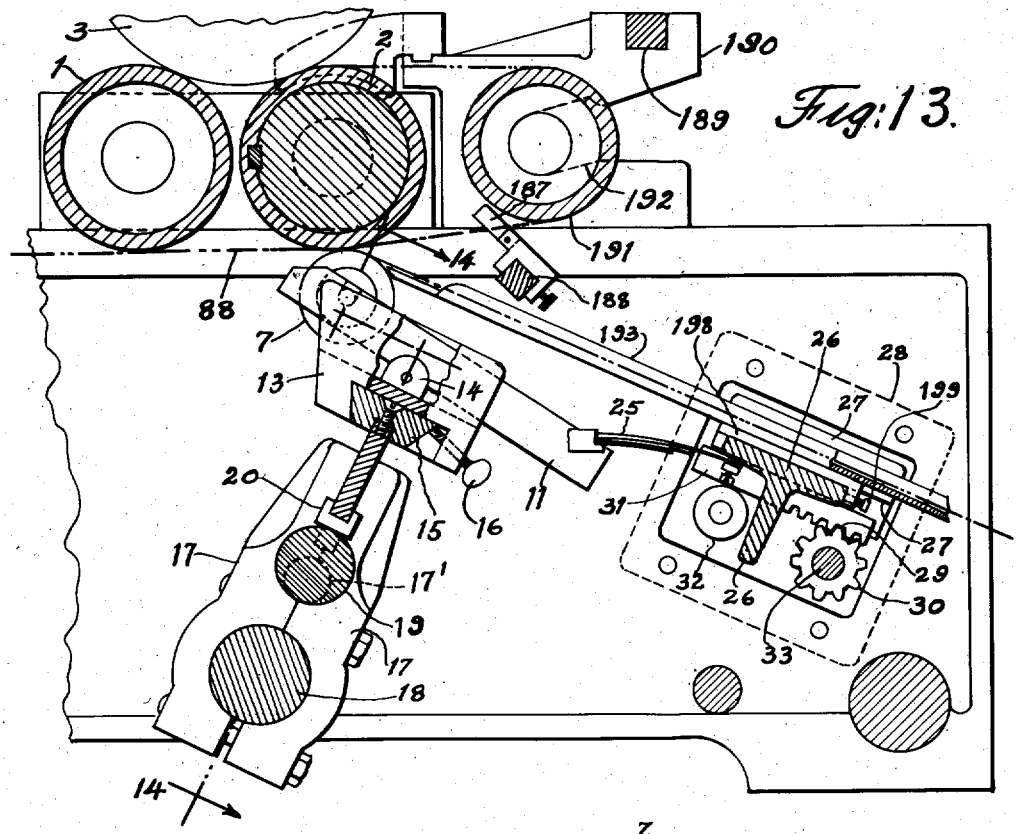
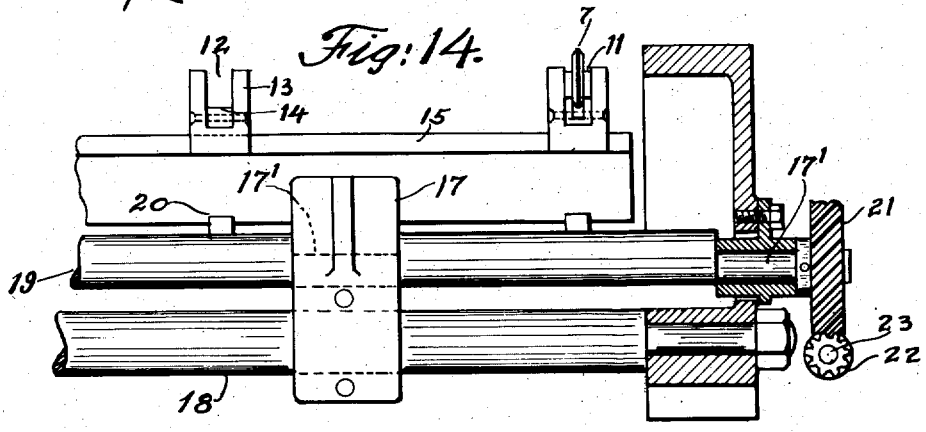
James A. Cameron & Gustav B. Birch
INVENTORS
BY
Fred Beecher
ATTORNEY.

Reissued Sept. 22, 1925. Re. 16,169

UNITED STATES PATENT OFFICE.

JAMES A. CAMERON AND GUSTAF BIRGER BIRCH, OF BROOKLYN, NEW YORK, ASSIGNORS TO CAMERON MACHINE COMPANY, OF BROOKLYN, NEW YORK, A CORPORATION OF NEW YORK.

SLITTING AND REWINDING MACHINE.

Original application filed December 9, 1916, Serial No. 135,947. Renewed January 13, 1922, Serial No. 529,097. Original No. 1,465,964, dated August 28, 1923. Application for reissue filed July 17, 1925. Serial No. 44,409.

*To all whom it may concern:*

Be it known that we, JAMES A. CAMERON and GUSTAF B. BIRCH, citizens of the United States, and residents of the borough of Brooklyn, in the county of Kings, city and State of New York, have invented certain new and useful Improvements in Slitting and Rewinding Machines, of which the following is a specification.

This invention relates to slitting and rewinding machines generally and in particular to slitting and rewinding machines of the surface rewind type.

In the art of slitting and rewinding sheet material as heretofore practiced, machines of the surface rewind type, of which that shown in Patent No. 1,076,189 is an example, have been constructed to operate successfully on rolls of material of medium size. Difficulty, however, has been experienced in adapting these machines to handle the massive mill rolls that are being produced in constantly increasing sizes as the art of manufacturing such material is developed. These difficulties have taken various forms. One of them has been the impossibility, with the type of top pressure roll mechanism heretofore used, of mounting the rewinding apparatus on a low frame to thereby secure stability of the rewound coil supporting means and facilitate the removal of the finished coils.

Another serious difficulty has been the failure to produce a machine with a web deflecting roll of sufficient rigidity not to bend under the enormous strain attendant upon drawing the web from the larger mill, or web, rolls. Furthermore it has not only been difficult to overcome the inertia of the mill roll and start it into rotation, but, on the other hand, it has also been difficult to check its rotation after it has been started and prevent the wasteful unwinding of a great length of web when the operation of the machine was stopped. Another difficulty connected with the use of large and cumbersome mill rolls has been the question of longitudinally adjusting the mill roll in its support to properly align the web with the cutting mechanism. It has also been found that with certain materials, it has sometimes been difficult to rotate the cutting discs at a sufficiently high speed to insure a perfect slitting of the web.

The main object of this invention is to provide a slitting and rewinding machine in which these and other difficulties have been overcome, and which is particularly adapted to operate on rolls of material of maximum size with a consequently greatly increased output.

The invention consists further in providing a slitting and rewinding machine in which the roll around which the slitted web is deflected as it is drawn through the machine to the rewound coils is of such a relatively large size as not to bend under the resisting pull of a mill roll of the largest size. The large size of the deflecting roll not only adds to its rigidity, but, in addition, a large area of contact on the roll is applied to the surface of the web so that the speed of travel of the web and, to a great extent, the feeding of the web through the machine, is controlled by this roll. In one form of the invention the large deflecting roll serves also as a rewound coil supporting and rewinding roll, but in another embodiment of the invention, this roll is so mounted as not to perform a supporting or rewinding function and serves solely to guide and draw the web through the machine. In either of these forms of the invention the cutter roll is preferably driven at a higher peripheral speed than that of the large deflecting roll and, consequently, than the speed of travel of the web. The invention consists also in the provision of means for controlling the rotation and the longitudinal placement of the mill roll shaft. Other features of the invention will be referred to as the description proceeds.

In the accompanying drawings there is illustrated a preferred embodiment of the invention, but it is to be understood that the invention may be carried out by other embodiments and by mechanism widely different from that selected for illustration.

In the drawings, in which like reference characters are used to designate like parts throughout the several views, Figure 1 is a side elevation of a machine embodying the invention.

Figure 11 is a vertical transverse section taken along the line 11—11 of Figure 1 and showing the braking and adjusting mechanism for the mill roll shaft, and the web spreading device.

Figure 12 is a detail view partly in section showing the shaft coupling means used between the mill roll and brake shaft.

Figure 13 is an enlarged vertical section of a part of the machine showing a modified form of arrangement for the cutting mechanism.

Figure 14 is a view with parts broken away looking substantially along the line 14—14 of Figure 13 and showing the side framework in section and the cutter supporting means in elevation.

In the particular embodiment of the invention chosen for illustration there is shown a slitting and rewinding machine of the type in which the rewound coils are supported and driven by their peripheral surface engagement with a pair of rewinding rolls. These rolls rotate in the same direction and preferably cooperate with a third rewinding roll pressing on the top of the rewound coils and thereby rotate the coils and cause the slitted material to be wound thereon. One of the supporting rolls of the surface rewinding mechanism just described preferably serves as a cutter roll for the cutting discs of the slitting mechanism as in Patent No. 1,076,189, already referred to.

In the preferred embodiment of the invention herein illustrated, the rewinding mechanism comprises the rewinding and supporting rolls 1 and 2 upon which the rewound coils 3 are directly supported. A rewind shaft 4 forms a core for the rewound coils and is so mounted in the machine that it is free to rise as the diameter of the coils increases. The rewinding rolls 1 and 2 rotate in the same direction and preferably cooperate with a third rewinding, or riding pressure roller 5 pressing on the top of the rewound coils so that the rewound coils 3 are in effect gripped between the oppositely acting supporting rolls 1 and 2, and the top pressure roller 5 and thereby rotated to cause the slitted material to be wound thereon.

Figure 2:
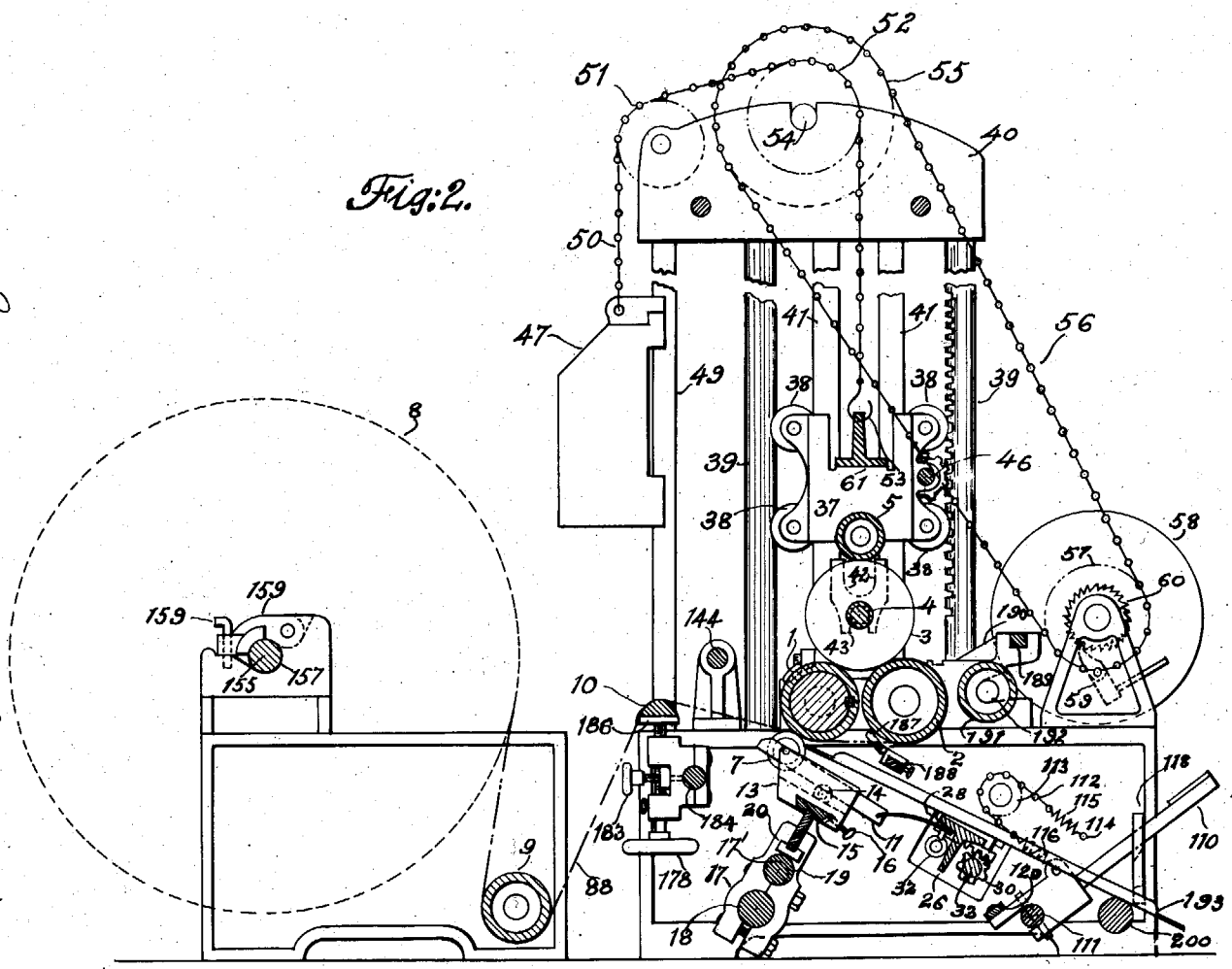
Figure 2 is a vertical transverse sectional view of the machine looking upward from the line 2—2 in Figure 5.

In the patent heretofore referred to the web slitting mechanism is shown as including cutting discs which co-operate with the front rewinding roll from which the web passes directly to the rewound coils. A slitting mechanism having this general arrangement is also shown in Figure 13 of the drawing in this case. In the embodiment of the slitting mechanism which is best shown in Figure 2 of the drawing the rear rewinding roll 1, and not the relatively larger front rewinding roll 2, is employed as a cutter roll. Co-operating with the cutter roll 1 are the cutting discs 7 which slit the web 88 as it passes from the mill roll 8 over the guide roller 9 and tensioning device 10 on its way to the rewinding mechanism. In the embodiment of the invention shown in Figure 15 the front rewinding roll 2, which in this case is equal in size to the rear rewinding roll 1, is employed as the cutter roll and a special web deflecting, or breast, roll 191, which is relatively larger than the rewinding rolls 1 and 2, is mounted out of contacting relation with the rewound coils.

Figure 1:
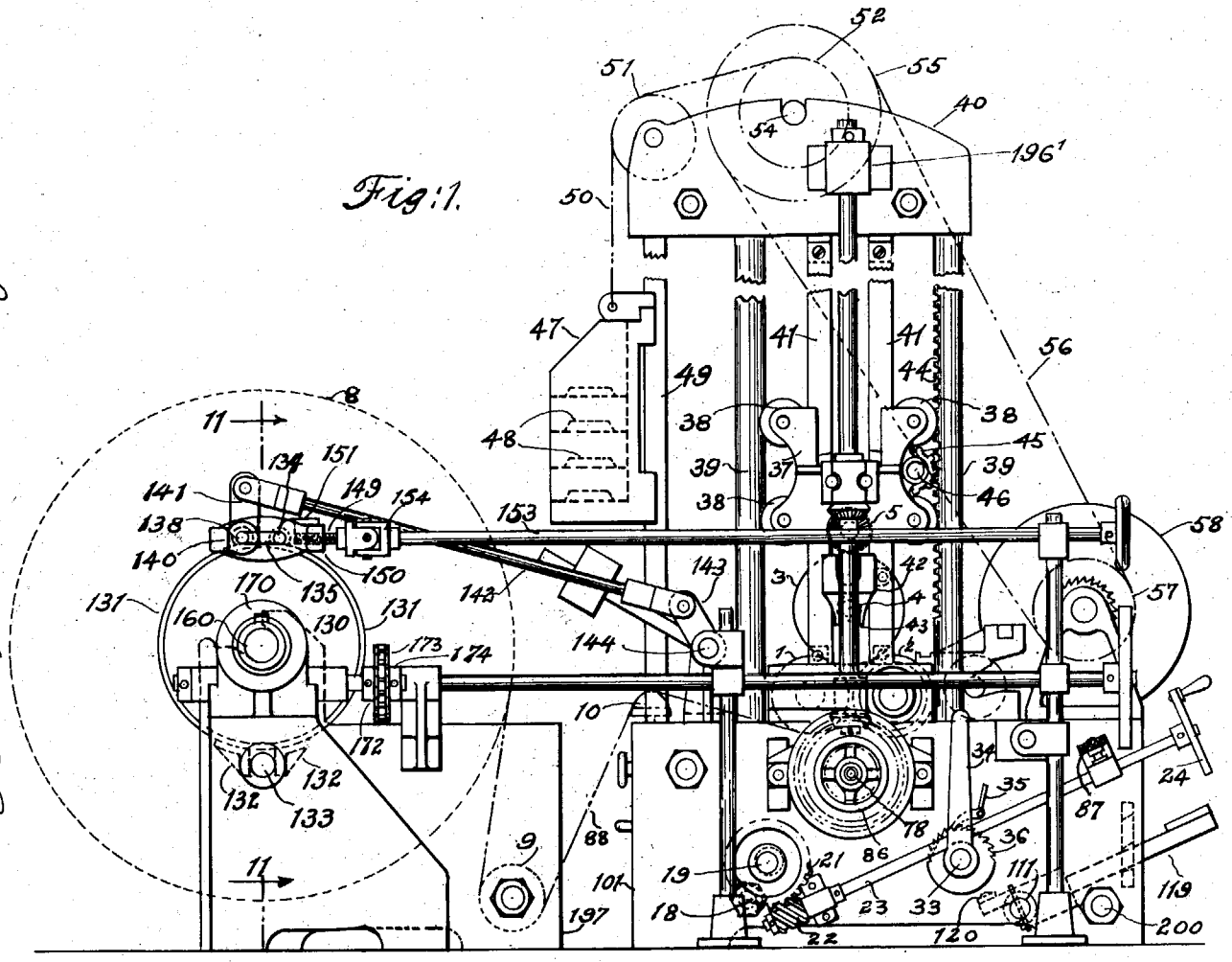

The cutting discs 7 as shown in Figures 2, 13 and 14, are preferably journaled in bars 11 which are in turn mounted in channels 12 in the spacing members 13 and adapted to rock therein about the fulcrums 14. The spacing members are adapted to be moved along the head of the supporting member 15 and to be rigidly clamped in any desired position thereon by means of the thumb screws 16. The base of the supporting member 15 is slidably supported in brackets 17 firmly clamped to the stay rod 18 which extends across the machine. An eccentric shaft 19 also extends across the machine and is provided with reduced bearing portions 17′ which are journaled in the brackets 17 and in the framework at the sides of the machine. The member 15 bears through the wear pieces 20 against the eccentric shaft 19 whereby when the shaft is rotated the member 15 will be raised or lowered to move the cutting discs 7 into or out of engagement with the cutter roll 1. In order to manipulate the eccentric shaft 19 a spiral gear 21 is provided on the end of the shaft which meshes with a spiral gear 22 mounted on a rod 23 which terminates in the hand wheel 24 at the front of the machine as shown in Figure 1 of the drawing. A locking screw 87 serves to hold the parts in set position.

The cutting discs 7 are preferably resiliently pressed against the cutter roll through the action of the leaf springs 25 which are mounted in the cutting disc supporting bars 11 and bear at their extended extremities against the abutment beam 26. The beam 26 is preferably so mounted that it can be withdrawn bodily out of engagement with the ends of the springs 25. For this purpose the top of the beam 26 is adapted to slide along the lower surface of the lugs 27 projecting from the brackets 28. A rack 29 carried by the beam 26 meshes with a pinion 30 and provides a means for moving the beam. A guiding lug 31 carried by the beam co-operates with the roller 32 to hold the beam in sliding engagement with the under surface of the lug 27. The pinion 30 is mounted on a stub shaft 33 which carries at its outer end a hand lever 34 as shown in Figure 1 by means of which the shaft 33 and pinion 30 can be rotated and the beam 26 thereby moved to free the ends of the springs 25, whereupon the cutter disc bars 11 can be lifted out of the spacing members 13. A pawl 35 co-operates with a ratchet 36 on the stub shaft 33 to lock the shaft 33 and pinion 30 and thereby hold the beam 26 in spring engaging position.

Figure 4:
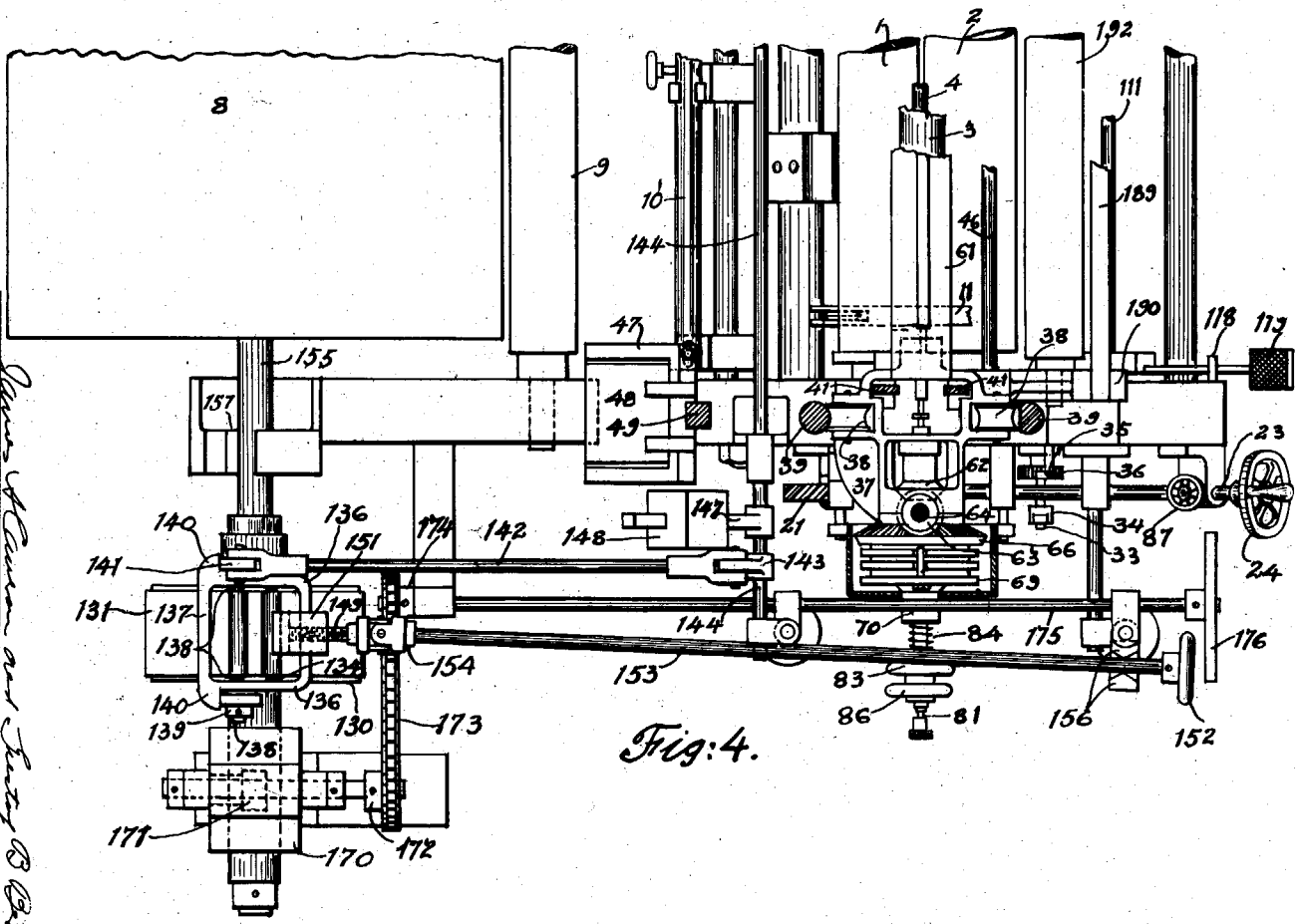
Figure 4 is a plan view partly in section of the end of the machine which is shown in elevation in Figure 1.
Figure 5:
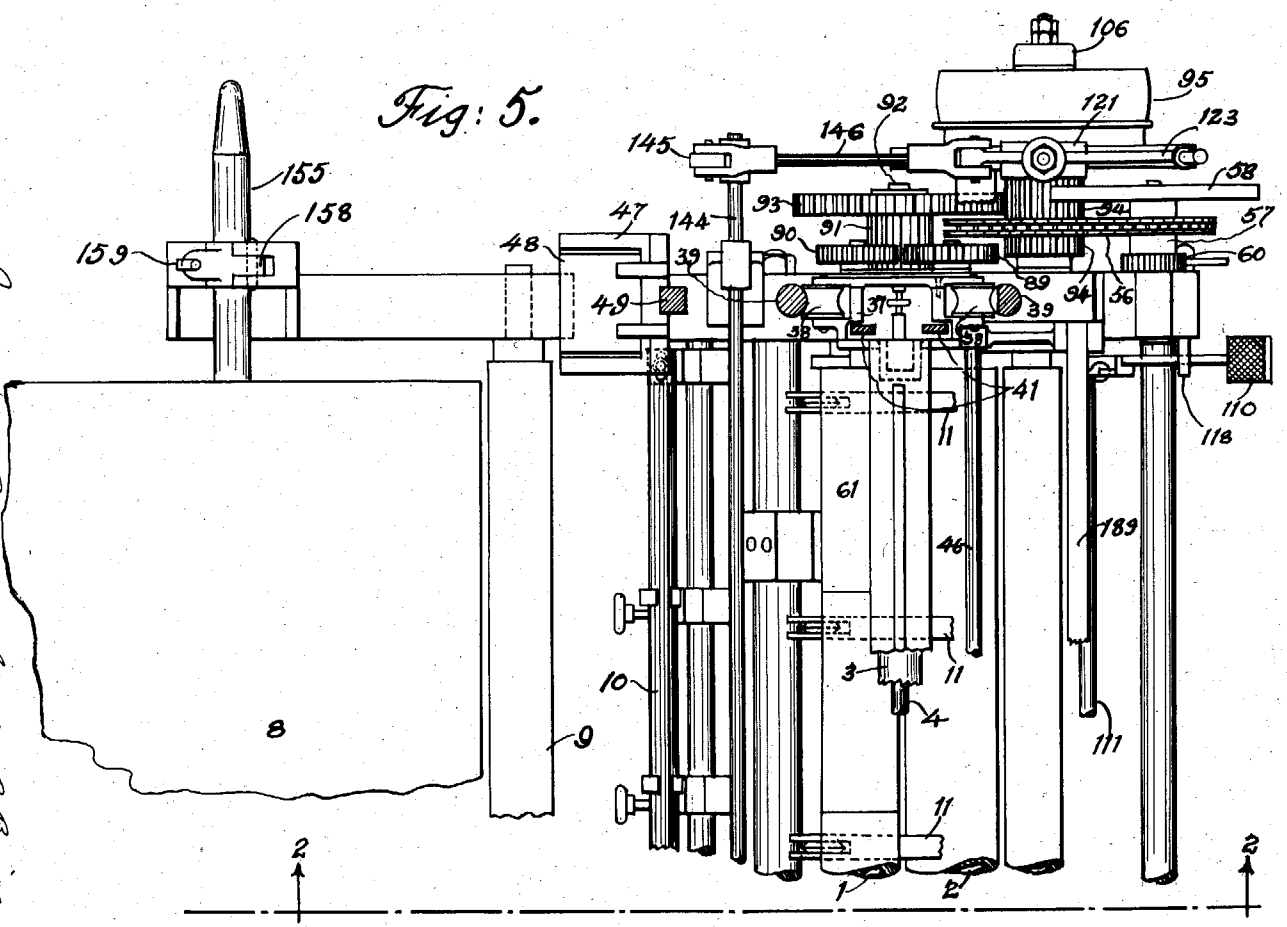
Figure 5 is a plan view partly in section of the end of the machine which is shown in elevation in Figure 3.
Figure 6:
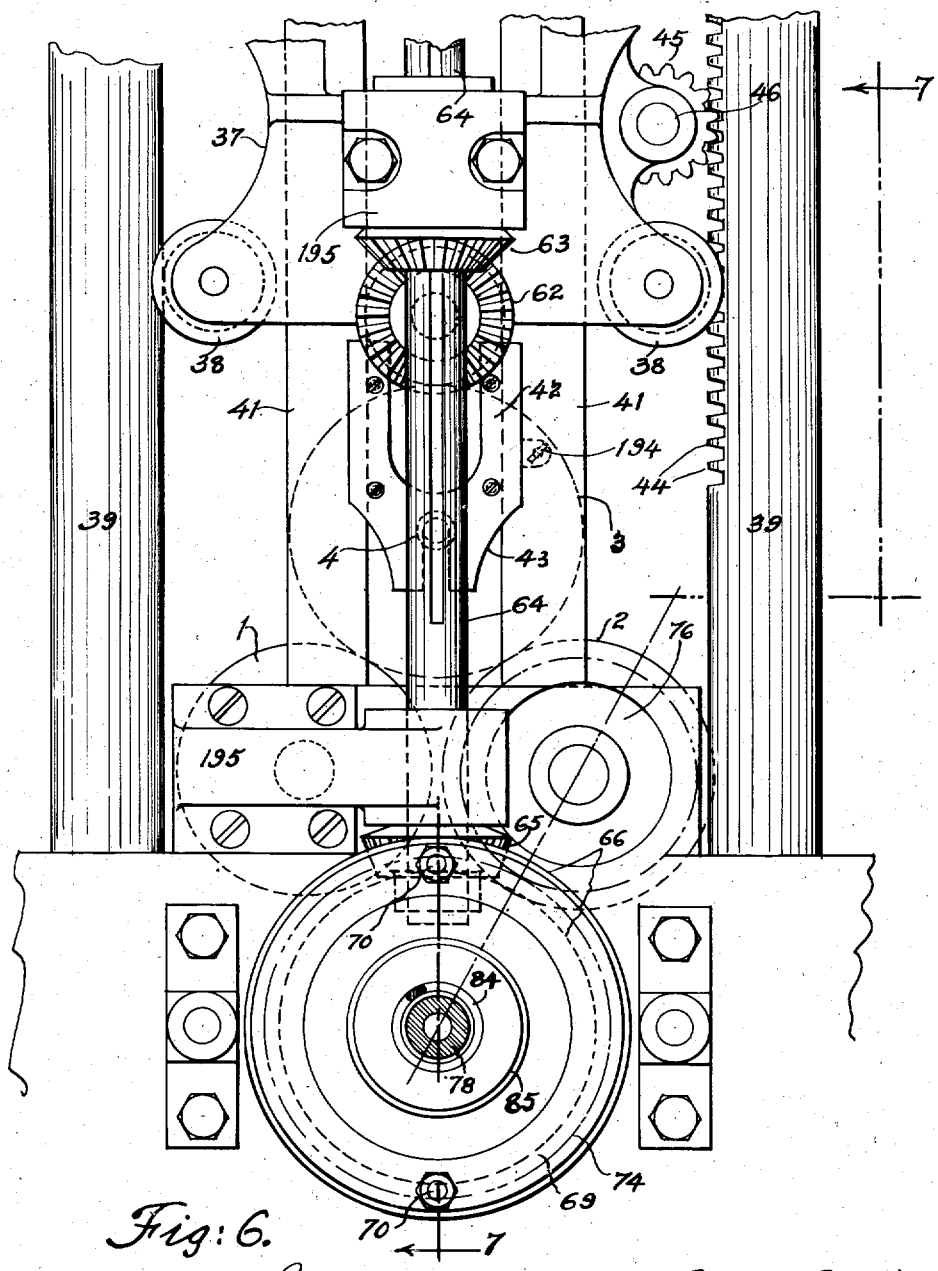
Figure 6 is an enlarged detail view of a part of the machine looking from the left of Figure 7.
Figure 7:
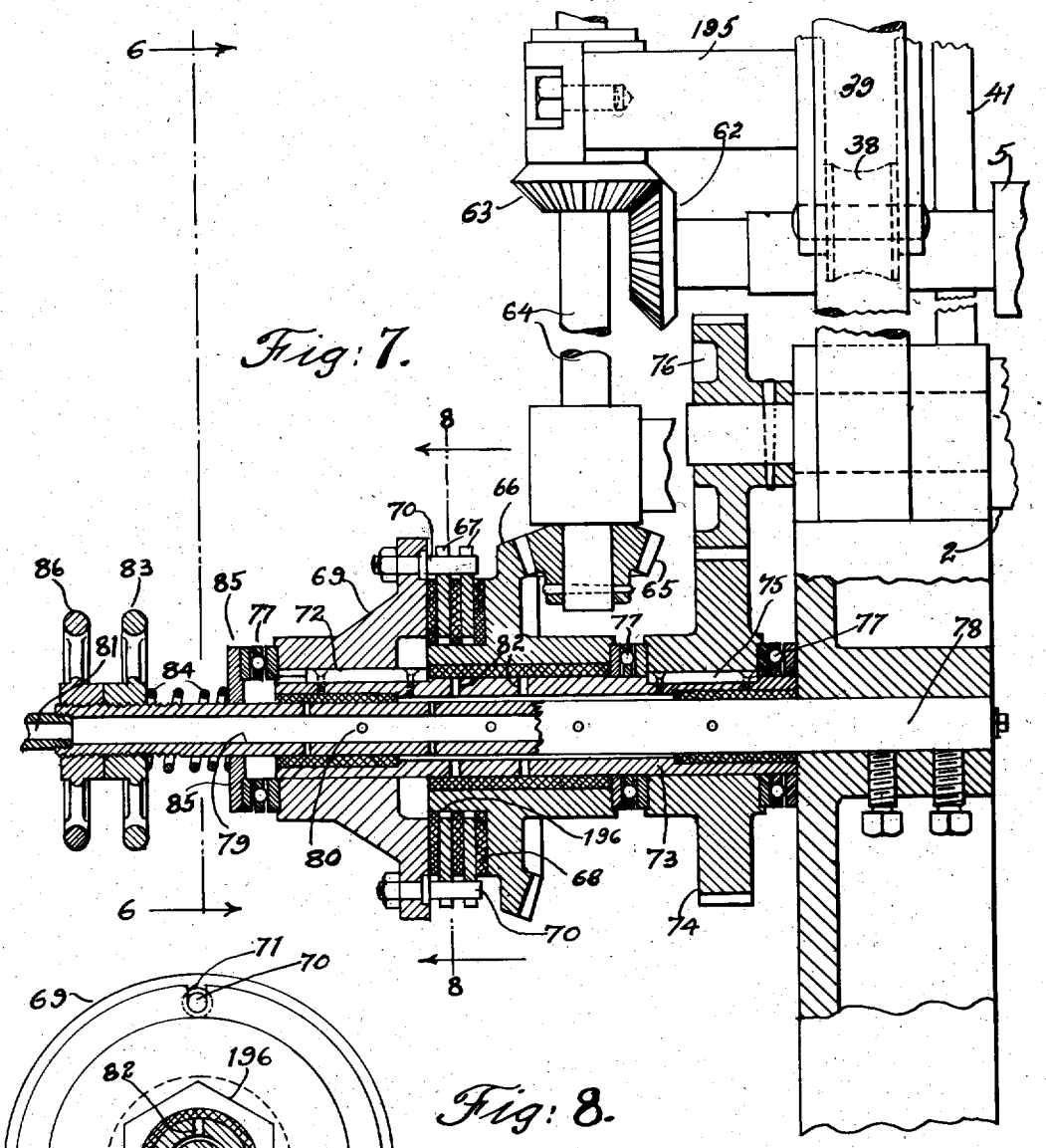
Figure 7 is a view partly in elevation and partly in section taken approximately along the line 7—7 of Figure 6 and showing the clutch drive.
Figure 8:
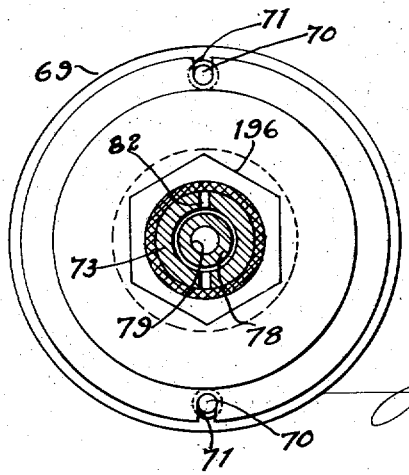
Figure 8 is a sectional view taken along the line 8—8 in Figure 7 and showing the manner of mounting the friction rings of the clutch.

In the form of machine shown in the patent referred to, the rewinding roller which is used to apply pressure to the upper surface of the rewound coils is mounted in a framework which is provided with downwardly extending guide members which are adapted to move vertically with the roller supporting framework. This form of mounting gives very satisfactory results with a machine having a high framework such as is shown in the patent, in which ample space is provided for the downward extension of the guide members. In the present invention, however, one of the objects is to provide a machine having a low frame and to accordingly devise a form of mounting in which downwardly extending guide members are not used. To this end the top pressure roller 5 is preferably journaled at the ends in the carriages 37 which are rigidly connected by means of the beam 61 which extends from side to side of the machine for this purpose as shown in Figures 2, 4 and 5. In lieu of the downwardly extending guide members of the patent the carriages in this instance are provided with guide rollers 38 which engage and travel along the stationary vertical guide posts 39 as the pressure roller 5 is lifted in accordance with the increasing diameter of the rewound coils.

Figure 10:
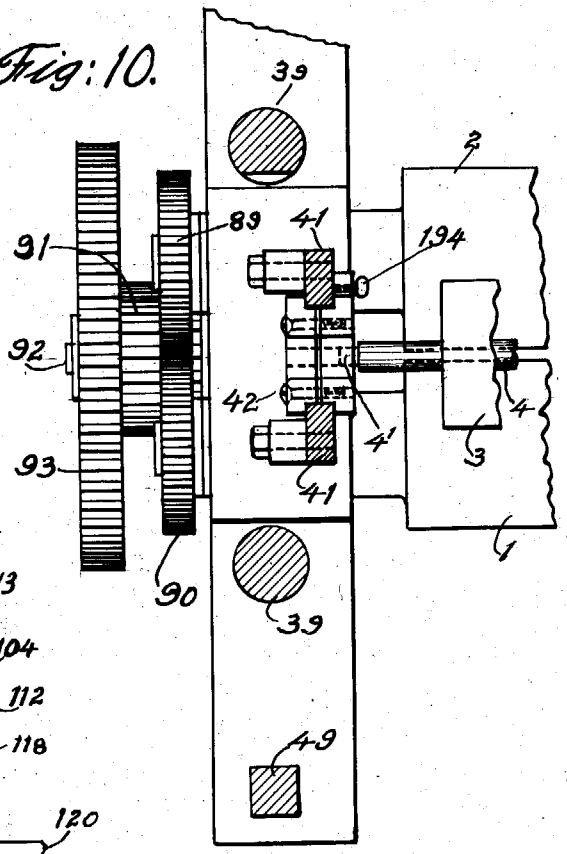
Figure 10 is an enlarged horizontal section taken along the line 10—10 of Figure 3 and showing the manner of mounting an end of the rewind shaft.

The posts 39 form a rigid part of the framework of the machine and serve to support the head pieces 40 to which tie rods extending across the top of the framework may be attached. Additional guide posts 41 extend through the framework of the carriages 37 and serve as sliding ways for the U-shaped guide members 42 which direct the vertical movement of the rewind shaft 4 as the rewound coils 3 increase in diameter. Horizontal movement of the rewind shaft is prevented by the downwardly extending lugs 43 carried by the guide members 42 and between which the reduced ends 4′ of the shaft 4 are held. The guide members 42 are preferably made in sections which are clamped together as shown in Figure 10, and are preferably adapted to be locked in an elevated position by means of the thumb screws 194.

It has been found in practice that the rewound coils can be most effectively built up if the rewinding roll 1 and the pressure roller 5 are rotated at a higher peripheral speed than the peripheral speed of the rewinding and supporting roll 2. It has also been found that the slitting operation is facilitated by providing for the rotation of the slitting discs at a peripheral speed at least equal to the speed of travel of the web. In order to insure the rotation of the slitting discs 7 at the required speed they are preferably arranged to co-operate with the rewinding roll 1 as shown in Figure 2, which, as has been stated, rotates at a higher peripheral speed than the peripheral speed of the rewind roll 2 which determines the speed of travel of the web. The engagement of the discs 7 with the cutter roll 1 serves to rotate the discs at a peripheral speed at least equal to, and preferably slightly higher than, the speed of travel of the web 88 and results in a more effective operation of the slitting discs 7, since they are thereby caused to sever the material with a sliding cut instead of merely pressing their way through it. The effectiveness of the slitting operation is still further increased by mounting the discs 7, not directly at the point of tangency of the stretch of the web with the cutter roll 1, but offset somewhat from this point toward the direction from which the web is moving so that the web is put under a certain amount of tension by the direct engagement therewith of the slitting discs as it passes over the discs on its way to the cutter roll 1.

It will be seen that the pressure exerted by the slitting discs against the web will have a tendency to initiate a cutting operation which can then more easily be completed when the web passes between the points of engagement of the disc 7 and the cutter roll 1.

It will be noted that, in the form of the invention shown in Figure 2, the front rewinding roll 2 has a greater diameter than has the rear rewinding end cutter roll 1. The purpose of this is to secure a sufficient degree of rigidity of this roll so that it will withstand the enormous strain put upon it in unwinding the web from the larger mill rolls and particularly in starting the mill rolls from a condition of rest. It will be noted that both of the rewinding rolls 1 and 2 and also the riding roller 5 all play a part in the rewinding and consequently in the feeding of the web through the machine. This function, however, is mainly carried out by the large front rewinding roll 2, just referred to. In addition, therefore, to the increased rigidity of the roll secured by the enlarged size, another function is secured, and that is the increased capacity of this roll to govern the travel of the web because of the enlarged area of surface in direct contact with the web. It will be seen that by means of this large area of contact the roll 2 is enabled to exert sufficient friction on the web to insure that it will be uniformly and positively fed through the machine at a speed equal to the peripheral speed of the roll.

Figures 3, 15:
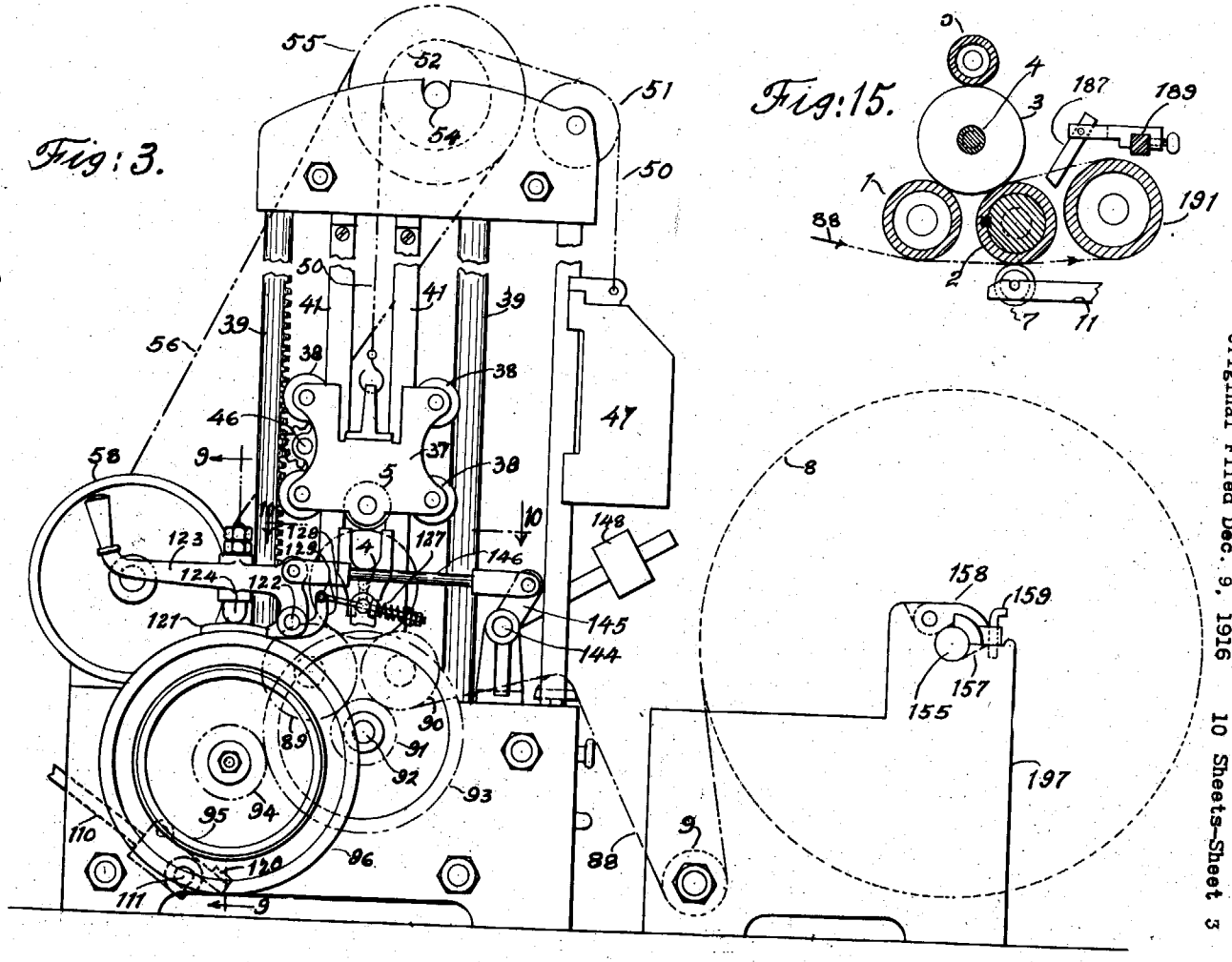
Figure 3 is a side elevation of the machine taken from the side opposite that shown in Figure 1.
Figure 15 is a detailed sectional view showing a modified arrangement of the slitting and rewinding mechanism in which the large web deflecting roll is not in supporting engagement with the rewound coils.

In the arrangement of the cutting and rewinding mechanism shown in Figure 15, the rear rewinding roll 1 and the front rewinding roll 2 are preferably of the same size and the front rewinding roll is utilized as a cutter roll. In order to utilize the front roll as a cutter roll and at the same time to rotate the cutter roll and the cutting discs at a relatively greater speed than the speed of travel of the web, in this modification an enlarged driven breast roll 191 out of engagement with the rewound coils but adjacent the front roll 2 is made use of. The function of the large breast roll 191 is substantially the same as that of the large rewinding roll 2 of Figure 2, that is, to guide and draw the web through the machine. In this arrangement, however, the large roll is relieved of the rewound coil supporting function which is characteristic of the large roll 2 of Figure 2. In this arrangement as in the arrangement of Figure 2, the speed of travel of the web is determined by the speed of travel of the large roll. In Figure 15, however, the speed of peripheral travel of four, instead of three rolls, is progressively increased. That is, the peripheral speed of the breast roll 191, which is the speed of travel of the web, is at a certain rate; the peripheral speed of the front rewinding 2, which governs the speed of the cutter discs 7, is slightly greater; the peripheral speed of the rear rewinding coil 1 is still greater; and the peripheral speed of the riding roller 5 is greatest of all. Thus, a speed of rotation of the cutter discs greater than the speed of travel of the web is attained, and the progressively increasing speeds of the rewinding rollers insures a firmly wound set of rewound coils as has already been explained.

Figure 9:
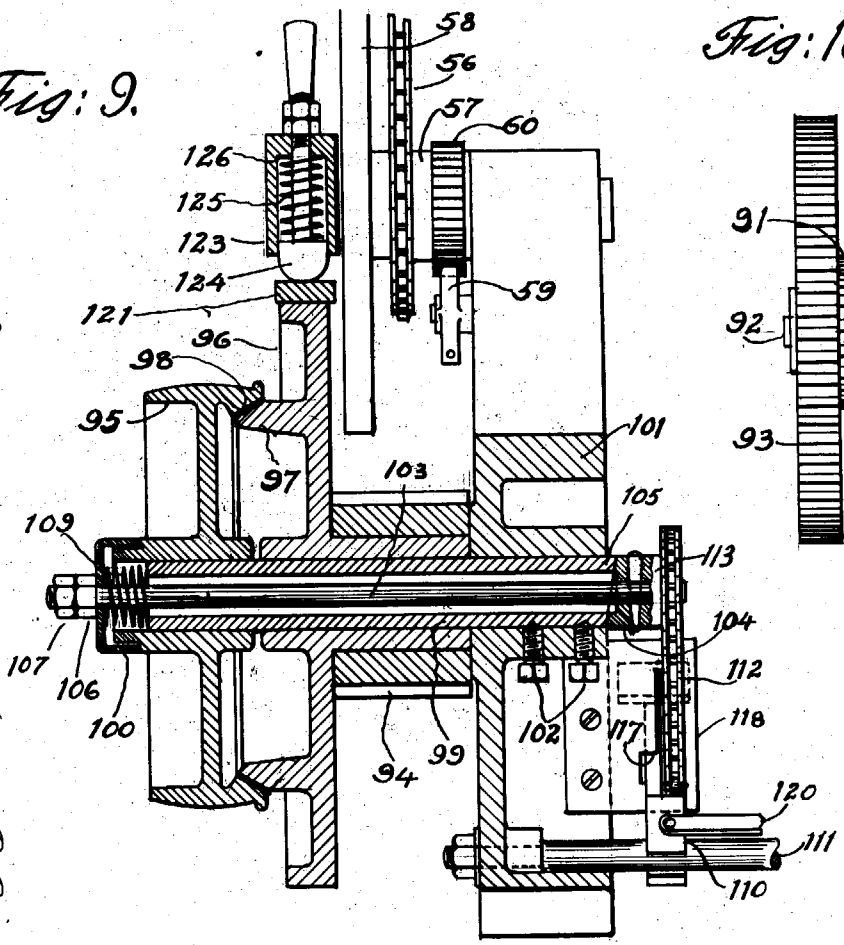
Figure 9 is an enlarged vertical section taken through the main driving clutch along the line 9—9 of Figure 3.

Owing to the larger size and consequent greater momentum of the moving parts in a machine of this type, a braking mechanism is preferably provided which is readily accessible for manual actuation by the operator. This mechanism as shown in Figures 3 and 9 includes a brake shoe 121 which is pivoted on a stud 122 on the framework and is adapted to frictionally engage the periphery of the fly wheel 96 to thereby bring the driven parts to a stop. The brake is preferably brought into operative position by means of a hand lever 123 also pivoted on the stud 122 and carrying a thrust transmitting member 124 adapted to bear directly against the brake shoe 121. The member 124 is preferably yieldingly mounted in a socket 125 in the lever 123, the spring 126 being arranged to permit the member 124 to yield when an excessive degree of force is offered to the brake lever 123. In order to hold the brake mechanism normally inoperative, a spring 127 exerts pressure on a rod 128 which is connected with a stud 129 projecting from the brake shoe and acts to withdraw the brake shoe from engaging position when the lever 123 is released.

In the practice of the invention it is desirable to provide means that will co-operate with the mill roll to produce a constant tension on the web to thereby overcome any tendency that the rotating roll might have to momentarily increase its speed and, by producing a slack stretch in the web, interfere with the operation of the device. The provision of such tensioning means is especially desirable in handling mill rolls of the larger sizes. It is equally desirable that a braking mechanism be provided which will stop the rotation of the mill roll, and thus prevent the unwinding of a great length of web, when the operation of the machine is stopped. An example of a combined tensioning and braking mechanism is shown in Figures 1, 4 and 11 of the drawing and takes the form of a band brake comprising a pulley or movable member 130, the periphery of which is adapted to be frictionally engaged by the brake band 131. The brake band is attached to stop members 132 at the lower side of the pulley which engage opposite sides of a tie rod 133 to hold the brake band 131 stationary and prevent its being carried about with the rotating pulley. The brake band is normally set so as to grip the pulley with sufficient force to maintain the web under tension. In order to pull the ends of the brake band toward each other to thereby cause the band to grip the pulley with sufficient force to stop the rotation of the roll, that end of the band which passes over the right-hand face of the pulley in Figure 1 of the drawing is secured to a cross bar 134 having its ends mounted in slots 135 in the side members 136 of the frame designated generally at 137. The other end of the brake band is secured to the rock shaft 138 which passes through the slots 135 and has the cams 139 mounted on its ends outside the frame members 136. The cams 139 engage the shoulders 140 on the frame when the shaft is rocked and force the rock shaft 138 and the cross bar 134 toward each other in the slots 135 and consequently pull the ends of the band toward each other to thereby cause the brake band 131 to grip the pulley with sufficient force to stop its rotation.

It is desirable to provide a single actuating means for both the brake mechanism of the slitting and rewinding machine proper and the brake mechanism which is especially provided for the mill roll shaft. To this end the rock shaft 138 which rotates the cams 139 to pull the brake band ends together has an arm 141 fixed to one end thereof which is connected through a rod 142 with a corresponding arm 143 rigidly carried by the rock shaft 144 extending across the machine. The rock shaft 144 thus serves as a medium for connecting the hand lever 123 of the main machine brake 121, through the arm 145 and link 146, with the mill roll shaft controlling brake band 131 at the opposite side of the machine. A weight 148 carried by an arm 147 on the rock shaft 144 tends to move both the braking mechanism to inoperative position and supplements the action of the spring 127, already referred to, in securing this function.

In order to effect the control of the interchangeable mill roll shafts through the tensioning and brake mechanism, means are provided for coupling the mill roll shafts to a brake on which the braking mechanism is permanently mounted. The mill roll shaft 155 carrying the roll of material 8 is adapted to be lifted into place in the bearings 157 formed in a roll supporting framework 197. Means are provided for locking the end of the mill roll shaft opposite the brake, in place in its bearing and takes the form of a pivoted latching member 158 which is adapted to be secured in its latching position by means of the removable pin 159 as shown in Figures 2 and 3 of the drawings.

The mill roll shaft 155 is preferably adapted to be coupled to the shaft 160 on which the tensioning and brake mechanism is mounted through a coupling head 161 carried by the brake shaft having a slot 162 cut diametrically across the face thereof. A coupling member 163 carried by the end of the mill roll 155 has a projecting tongue 164 arranged diametrically across its face which is adapted to fit into the slot 162 of the brake shaft head 161. The tongue 164 has notches 165 cut intermediate its ends with which the inwardly extending lugs 166 carried by a locking ring 167 rotatably mounted on the brake shaft head 161 are adapted to engage to lock the tongue 164 against removal from the slot 162. A groove 168 in the coupling head 161 receives the inwardly projecting lugs 166 of the locking ring and not only prevents the removal of the ring from its head but also provides for the rotation of the ring into and out of locking position.

In order to vary the gripping effect of the tensioning device in accordance with the requirements of different mill rolls, provision has been made for adjusting the length of the gap which normally separates the ends of the brake band. This adjusting means is best shown in Figures 1 and 4 of the drawing and comprises a screw 149 which is threaded through a seat 150 in the frame 137 and can be manipulated to move the cross bar 134 toward and from the other cross bar 138 to thereby vary the gripping action of the brake band. Preferably interposed between the cross bar 134 and the band end which it carries, and the end of the screw 149, is an abutment member 151, slidably mounted on the frame 137 and adapted to transmit the longitudinal movement of the screw to the cross bar 134. In order to turn the screw 149, a hand wheel 152 is provided which operates the screw 149 through the shaft 153 and universal joint 154, the universal joint providing for the longitudinal adjustment of the mill roll shaft. The hand wheel 152 is adapted to tilt horizontally about the edges 156 to allow for the lateral movement of the brake engaging end thereof. It will be seen that a combined tensioning and brake mechanism has been provided which can be adjusted to exert any desired tension on the web during the operation of the machine, and can in addition be manually actuated as a brake to stop the rotation of the roll at the will of the operator.

Because of the difficulty of mounting a large and heavy mill roll in correct lateral relation to the operating mechanism, means have been provided for laterally adjusting the mill roll after it has been put in place in the bearings 157. This mechanism comprises a rack member 169 mounted on the shaft 160 and adapted to give a longitudinal movement thereto in the bearing 170. A pinion 171 meshes with the rack 169 and is driven from a sprocket 172 through chain 173 and sprocket 174. The sprocket 174 is in turn operated through the shaft 175 by means of the hand wheel 176. It will be seen that by this construction the mill roll shaft 155 through its connection with the brake shaft 160 can be moved along its axis to adjust the position of the mill roll in its lateral relation to the machine.

In describing the rewinding mechanism which acts on the upper surface of the rewound coils it was pointed out that stationary vertical guide posts 39 were provided along which the pressure roller supporting carriages 37 were adapted to travel. It is essential that the pressure roller 5 be held in a constantly parallel relation to the rewind shaft in order to exert a uniform pressure from end to end of the rewound coils. In order to effect this one of the guide posts 39 at each side of the machine has been provided with rack teeth 44 with which mesh pinions 45 rigidly mounted on a shaft 46 which extends from one side of the machine to the other and is journaled in the carriages 37. It will be seen that by this construction any rotation of either pinion will be directly transmitted to the other so that the pinions must always rotate in unison and thus maintain the parallel relation to the pressure roller and the rewind shaft.

In order to regulate the pressure exerted by the pressure roll 5 in accordance with the requirements of different classes of material, counterweights are provided comprising receptacles 47 carrying the weights 48 and adapted to slide on the posts 49. Chains or other flexible connections 50 pass from the counterweights over the sprockets 51 and 52 in the members 40 and are attached at 53 to the carriages 37. The sprocket 52 is preferably fast to its shaft 54 and a second sprocket 55 also attached to the shaft 54 can be manually operated through the flexible connection 56 leading to a sprocket 57 attached to the hand wheel 58. A pawl 59 co-operates with a ratchet 60 to hold the pressure roller 5 in any desired elevated position. The provision of the means for manually lifting the pressure roll out of engagement with the rewound coils makes it possible to lift the pressure roll out of the way when a filled rewind shaft is to be removed.

In order to make the most effective use of the pressure roller 5 means are preferably provided for driving this roller independently of its peripheral engagement with the rewound coils as in the patent already referred to. The driving mechanism as shown in Figures 1, 6, 7, and 8 of the drawing includes a bevel gear 62 on the end of the pressure roll shaft which meshes with another bevel gear 63 journaled in a bearing carried by one of the carriages 37. A splined vertical drive shaft 64 journaled at its lower end in a bracket 195 carried by the frame-work and at its upper end in a bearing 196′ on the frame member 40 has the bevel gear 63 mounted to slide longitudinally thereon and is adapted to drive the mitre gear 63 in any position which the pressure roller 5 may take because of the changing diameter of the rewound coils. A bevel gear 65 mounted on the lower end of the splined shaft 64 meshes with the bevel gear 66 from which the splined shaft and riding roll is driven.

It has been found desirable to rotate the pressure roller 5 at different speeds in order to most effectively rewind different materials and generally the riding roller is driven at a faster peripheral speed than that of the rewound rolls in order to firmly wind the rewound coils. In order to change the speed of the riding roller to suit different conditions, a slip driving connection is provided which preferably takes the form of a friction clutch stationarily mounted on the framework constituting the base of the machine, and comprising the bevel gear 66, which constitutes the driven member, the positively driven rings 67, the frictionally driven rings 68, and the driving member 69. The driving member 69 is provided with studs 70 which engage slots 71 in the edges of the rings 67 in order to positively drive these rings. The rings 68 are smaller in diameter than the rings 67 so that they are not engaged by the studs 70 but are driven solely by their frictional engagement with the positively driven rings 67 in a well known manner. The rings 68 are preferably fitted to the hexagonal hub 196 of the bevel gear 66, so that the hub and rings are constrained to rotate together.

The driving member 69 is rotated through a spline connection at 72 with the sleeve 73 on which the gear 74 is keyed at 75. The gear 74 meshes with and is driven from a gear 76 on the end of the feed roll 2. Ball bearings 77 are provided for the various moving parts of the slip driving connection and the stud shaft 78 on which the parts are carried has a hollow center 79 and openings 80 through which lubricant can be forced to the bearing surfaces by means of the follower 81, threaded in the end of the cored shaft 78. Perforations 82 in the sleeve 73 serve to convey the lubricant to the exterior surface of the sleeve.

A hand wheel 83 can be adjusted to carry the pressure exerted by the compression spring 84 which acts against an abutment member 85 and through the driving member 69 to control the degree of friction exerted by the rings 67 and 68. A second hand wheel 86 serves to lock the hand wheel 83 in any adjusted position. It will be seen that the gear 74, sleeve 73 and the driving member 69 of the slip connection are so keyed together that they rotate in unison, and that the driven member 66 may be driven at any desired speed less than the speed of the driven member 69 in accordance with the effectiveness of the frictional contact between the rings 67 and 68, as determined by the position of the pressure adjusting hand wheel 83. The speed of the pressure rewinding roller 5, therefore, can be varied to suit the character of the particular material being operated upon.

In handling webs of great width difficulty has been experienced in keeping the web taut from edge to edge and correspondingly free from wrinkles. To obviate this difficulty a horizontal spreader bar 10, shown in section in Figure 2 and in elevation for a portion of its length in Figure 11, which is adapted to be bowed upwardly against the under surface of the web, is employed. In order that the spreader bar 10, which is preferably made of resilient and flexible metal, may be adjusted to different curvatures to conform to the requirements of different materials, means are provided for bending the bar into the form required. Each end of the spreader bar 10 has a slot 177 therein which provides for longitudinal movement of the end portions of the bar with relation to the hand screws 178 on which they are supported. The hand screws 178 can be turned in the threaded portions 179 of the brackets 180 to raise or lower the bar engaging nuts 182 on the upper ends of the screws and thereby determine the height of the end portions of the spreader bar. The locking screws 183 pass through the brackets 180 and are adapted to bear against the stay bar 184 to hold the brackets in any desired positions along the bar, while the thumb screws 185 mounted in the lugs 181 on the brackets serve to lock the screws 178 at any desired height. It will be seen that the adjusting screws 178 at the ends of the spreader bar are adapted to pull the ends of the bar downwardly while the remaining screws 178 intermediate the ends of the bar are adapted to bow the intermediate portion of the bar upwardly. In order to provide for the engagement of the intermediate screws with the bar to push it upward, the bearing members 186 are swiveled on the ends of the screws and directly engage the underside of the bar. It will be seen that the adjusting screws 178 can be manipulated to give the spreader bar 10 any desired curvature to thereby spread the web and remove any wrinkles or other irregularities therein before the cutting and rewinding operations take place.

It has been found desirable in slitting and rewinding certain materials to provide supplemental means for cutting any threads that might be left unsevered by the slitting discs, as well as to guide the strips and prevent them from overlapping as they pass to the rewound coils. In Figure 2 of the drawing one of the separating blades 187 is shown mounted on a supporting bar 188 in position to engage the slitted web immediately after it leaves the slitting mechanism. In placing the blades in this location and in then causing the slitted web to immediately engage and pass around the rewinding roll 2 a very efficient control of the strips is retained until they pass into place on the rewound coils. In Figure 13 of the drawing the separating blade is shown in a location where it will engage the web between the rewinding roll 2, which in this case is the cutter roll, and a guiding roll 191 around which the slitted web is diverted to provide a stretch in conjunction with which the separating blades can act. The guiding roll 191 is preferably removably mounted in bearings 192 provided in the brackets 190 for this purpose. In Figures 2, 13 and 15 an alternative mounting for a series of separating blades is indicated at 189. Separating blades mounted on this support engage the upper stretch of web as it passes from the guiding roll 191 to the rewinding roll 2 as indicated in Figure 15.

Attention is also directed to Figures 2 and 13 for a showing of a device for diverting the narrow trimming strips that are severed from the edges of the web, clear of the machine. These devices take the form of shallow sheet metal guiding members, or troughs, 193 generally U-shaped in section, one of which is so mounted near each side of the machine that they can be moved laterally to positions coincident with the edges of the web. Each guiding member 193 is attached to a supporting member 198 slidably mounted on the T-bar 26 and to which it can be clamped in any desired position by means of the thumb screw 199. The guiding members 193 rest at their lower ends on the tie rod 200 in Figure 2 of the drawing. The receiving end of each guiding member when in operative position is located closely adjacent the trimming strip cutter so as to receive the trimming strip immediately after it is severed.

A preferred form of driving means for the machine comprises the gears 90 and 89 which are mounted on the shafts of the rewinding rolls 1 and 2 and which mesh with a common driving gear 91 carried on a stud shaft 92. Carried on the same shaft 92 is the gear 93 which meshes with a gear 94 driven from the main drive pulley 95 which may have power applied to it from any suitable source.

Preferably a clutch connection is inserted between the drive pulley 95 and the gear 94 which consists of a fly wheel 96 rigidly connected to the gear 94 and having a friction cone flange 97 adapted to co-operate with a corresponding flange 98 on the drive pulley 95. In order to provide for a relative movement between the two clutch members 95 and 96, the stud shaft 99 on which these members are rotatably mounted is preferably made hollow. The stud shaft 99 is rigidly held in the framework 101 of the machine by means of the set screws 102 and carries a clutch actuating rod 103 which is attached to a clutch actuating cam member 104 adapted to co-operate with a cam face 105 on the inner end of the stud shaft 99. The other end of the clutch actuating rod 103 is provided with an adjusting nut 106 and a locking nut 107 through which motion can be transmitted from the rod 103 through the cap member 100 to the driving pulley and clutch member 95 in order to bring the clutch faces 97 and 98 into operative engagement. A push spring 109 bears against the end of the stud shaft 99 and tends to press the cap member outwardly and thereby disengage the clutch members.

Provision for the control of the clutch by the operator is made through the use of a foot lever 110 fulcrumed at 111 in the frame of the machine to move both vertically and horizontally, as shown in Figures 2, 5 and 9. A chain 112 attached at one end to the foot lever 110 passes over a sprocket 113 on the cam member 104 and is connected at its other end to a fixed point 114 in the frame. A pull spring 115 on the side of the pulley where the chain is anchored to the frame provides for a movement of that part of the chain which engages the sprocket and serves to move the cam members 104 and 105 to clutch disengaging position when the foot lever is released. A second spring 116 inserted in the chain on the other side of the sprocket serves to protect the parts against a too sudden or too extensive downward movement of the foot lever 110. A lug 117 shown in Figure 9 on the locking plate 118 serves to hold the foot lever in its lowermost or clutch engaging position. It will be seen that a movement of the foot lever laterally to the right as shown in Figure 9 of the drawing will release the lever from the lug 117. In order that the lever may be operated from the other side of the machine a second foot lever 119 shown in Figures 1 and 4 is mounted near the opposite side which is connected to the lever 110 through a connecting member 120. It will be seen that the clutch can thus be operated from either side of the machine should occasion require.

We claim:

1. A slitting and rewinding machine comprising: a pair of surface rewinding rolls on which the rewound coils are supported, one of said rewinding rolls constituting a cutter roll, and the other roll operating to deflect and feed the severed strips to the peripheries of the rewound coils, and means for driving the cutter roll at a higher speed than the other rewinding roll.

2. A slitting and rewinding machine comprising: a pair of surface rewinding rolls on which the rewound coils are supported, one of said rolls constituting a cutter roll, means co-operating with the cutter roll to slit the web, the path of travel of the web being such that it first engages the cutter roll to have the slitting operation performed thereon and then passes to the other roll which operates to deflect and feed the severed strips to the peripheries of the rewound coils, and means for driving the cutter roll at a higher speed than the other rewinding roll.

3. A slitting and rewinding machine comprising: a pair of rolls peripherally engaging and supporting the rewound coils, one of said rolls constituting a cutter roll, means co-operating with the cutter roll to slit the web into strips, the other roll operating to deflect and feed the severed strips to the peripheries of the rewound coils, and means located between the rolls to complete the severance of the strips, and means for driving the cutter roll at a higher speed than the other rewinding roll.

4. A slitting and rewinding machine comprising: a pair of surface rewinding rolls on which the rewound coils are supported, one of said rewinding rolls constituting a cutter roll, means co-operating with said cutter roll to slit the web, the other roll operating to deflect and feed the severed strips to the peripheries of the rewound coils, and means for rotating the cutter roll at a higher peripheral speed than the speed of travel of the web.

5. A slitting and rewinding machine comprising: a pair of surface rewinding rolls on which the rewound coils are supported, one of said rewinding rolls constituting a cutter roll, slitting discs engaging the periphery of and driven by the cutter roll to slit the web, the other roll operating to deflect and feed the severed strips to the peripheries of the rewound coils, and means for rotating the cutter roll at a higher peripheral speed than that of the other roll to cause the slitting discs to rotate at a higher speed than the speed of travel of the web.

6. A slitting and rewinding machine comprising: a pair of surface rewinding rolls on which the rewound coils are supported, one of said rewinding rolls constituting a cutter roll, slitting discs engaging the periphery of and driven by the cutter roll to slit the web, the other roll having a greater diameter than the cutter roll and operating to deflect and feed the severed strips to the peripheries of the rewound coils, and means for rotating the cutter at a higher peripheral speed than the speed of travel of the web.

7. A slitting and rewinding machine comprising: means for feeding a web of material, a cutter roll, and a score cutting disc arranged to peripherally and frictionally engage the cutter roll to thereby slit the web, said cutter roll operating to rotate the cutting disc at a peripheral speed exceeding the speed of travel of the web.

8. A slitting and rewinding machine comprising: means for feeding a web of material, a cutter roll peripherally engaging the rewound coils, and a cutting disc cooperating with the cutter roll to slit the web, said cutter roll operating to rotate the cutting disc at a peripheral speed exceeding the speed of travel of the web.

9. A slitting and rewinding machine comprising: means for feeding a web of material, a cutter roll, and a cutting disc peripherally engaging the cutter roll to slit the web, means for guiding the web to the roll and disc, the relation of the cutting disc and the cutter roll with reference to the guiding means being such that the web engages the cutting disc before it reaches the point of engagement of the cutting disc with the cutter roll.

10. A slitting and rewinding machine comprising: means for feeding a web of material, a cutter roll, a cutting disc peripherally engaging the cutter roll to slit the web, means for guiding the web to the roll and disc, the relation of the cutting disc and the cutter roll with reference to the guiding means being such that the web engages the cutting disc before it reaches the point of engagement of the cutting disc with the cutter roll, and means for driving the cutter roll and cutting disc at a peripheral speed exceeding the speed of travel of the web.

11. In a slitting and rewinding machine, a shaft on which the slitted material is rewound, a roller in engagement with the upper surface of the rewound slitted material, vertically movable carriages in which the ends of the roller are journaled, guide rollers carried by said carriages, and vertical guide posts with which said rollers engage.

12. In a slitting and rewinding machine, a shaft on which the slitted material is rewound, a roller peripherally engaging the upper surface of the rewound slitted material, vertically movable carriages in which the ends of the roller are journaled, a pinion carried by each carriage, a stationary rack for each pinion, and a shaft rigidly connecting said pinions, whereby the carriages are maintained at the same level relatively to each other.

13. In a slitting and rewinding machine, a shaft on which the slitted material is rewound, a roller peripherally engaging the upper surface of the rewound slitted material, means for driving said roller to assist in winding said coils, vertically movable carriages in which the ends of the roller are journaled, a pinion carried by each carriage, a stationary rack for each pinion, and a shaft rigidly connecting said pinions, whereby the carriages are maintained at the same level relatively to each other.

14. A slitting and rewinding machine comprising: a front rewinding drum, a back rewinding drum, means for rotating the back rewinding drum at a higher speed than the front rewinding drum, said drum supporting the rewound coils, means for feeding the web to the back rewinding drum, a score cutter engaging the periphery of and driven by the back rewinding drum, the front rewinding drum operating to deflect and feed the several strips to the rewound coils.

15. Controlling means for a top pressure roll in winding machines comprising: a vertically displaceable top pressure roll, vertically extending stationary racks, a pinion shaft displaceable with said top pressure roll, pinions, on said pinion shaft, in engagement with said racks, and flexible connections, controlled from a fixed center of rotation, for raising and lowering the top pressure roll and pinion shaft to thereby cause rotation of the pinions in engagement with the racks.

16. Controlling means for top pressure roll in winding machines comprising: a vertically displaceable top pressure roll, vertically extending stationary racks, a pinion shaft displaceable with said top pressure roll, pinions, on said pinion shaft, in engagement with said racks, and means for raising and lowering the top pressure roll and pinion shaft to thereby cause rotation of the pinions in engagement with the racks.

17. Controlling means for top pressure roll in winding machines comprising: a vertically displaceable top pressure roll, vertically extending stationary racks, a pinion shaft, displaceable with said top pressure roll, pinions, on said pinion shaft, in engagement with said racks, rotatable transmission means above said top pressure roll and pinion shaft, flexible connections, weighted at their free ends, supporting said top pressure roll and pinion shaft and passing over said transmission means, means for raising and lowering, at will, said top pressure roll and pinion shaft including a train of connections including a pawl and ratchet for actuating the transmission means.

Signed at New York, in the borough of Brooklyn, county of Kings, and State of New York, this 15 day of July, 1925.

JAMES A. CAMERON.
GUSTAF BIRGER BIRCH.